United States Patent
Harrison et al.

(10) Patent No.: US 8,394,747 B2
(45) Date of Patent: *Mar. 12, 2013

(54) MANNICH CONDENSATION PRODUCTS USEFUL AS SEQUESTERING AGENTS

(75) Inventors: James J. Harrison, Novato, CA (US); Kenneth D. Nelson, Napa, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/068,176

(22) Filed: May 4, 2011

(65) Prior Publication Data

US 2011/0230379 A1   Sep. 22, 2011

Related U.S. Application Data

(62) Division of application No. 11/105,606, filed on Apr. 13, 2005, now Pat. No. 7,964,543.

(51) Int. Cl.
 *C10M 133/00* (2006.01)
 *C07C 209/00* (2006.01)

(52) U.S. Cl. ........ 508/542; 508/508; 508/513; 508/516; 564/393

(58) Field of Classification Search .................. 508/542, 508/508, 513, 516; 564/393
See application file for complete search history.

(56) References Cited

U.S. PATENT DOCUMENTS

| | | | |
|---|---|---|---|
| 3,725,277 A | 4/1973 | Worrel | |
| 3,877,889 A | 4/1975 | Dix | |
| 4,032,304 A | 6/1977 | Dorer, Jr. et al. | |
| 4,069,249 A | 1/1978 | Gaudette et al. | |
| 4,116,991 A | 9/1978 | Leneuf | |
| 4,130,582 A | 12/1978 | Petree et al. | |
| 4,166,726 A | 9/1979 | Harle | |
| 4,197,091 A | 4/1980 | Gainer | |
| 4,200,545 A | 4/1980 | Clason et al. | |
| 4,225,502 A | 9/1980 | Gaudette et al. | |
| 4,338,460 A | 7/1982 | Gaudette et al. | |
| 4,387,244 A | 6/1983 | Scanlon et al. | |
| 4,612,130 A | 9/1986 | Landry et al. | |
| 4,655,949 A | 4/1987 | Landry et al. | |
| 4,734,212 A | 3/1988 | Harrison et al. | |
| 4,847,415 A | 7/1989 | Roling et al. | |
| 4,883,580 A | 11/1989 | Roling et al. | |
| 4,894,139 A | 1/1990 | Roling et al. | |
| 5,122,161 A | 6/1992 | Benfaremo et al. | |
| 5,300,701 A | 4/1994 | Cherpeck | |
| 5,641,394 A | 6/1997 | Fisher et al. | |
| 6,126,837 A | 10/2000 | Miknevich et al. | |
| 6,733,551 B2 | 5/2004 | Carabell et al. | |

FOREIGN PATENT DOCUMENTS

EP   0 240 291   11/1990

OTHER PUBLICATIONS

Tascioglu, "Synthesis of some terpolymer resins and studies on their structure and use as cation exchangers", *Journal of Macromolecular Science*, vol. A31, pp. 367-382 (1994).
Didier Jamois, et al. Preparation of Amphiphilic Polyisobutylenes-b-polyethylenamines by Mannich Recation III. Syntheses of Polyisobutylenes-b-polyethyleneamines, Laboratoire de Synthese Macromoleculaire, pp. 1959-1966, Boite 184, Universite P. et M. Curie, 4, Place Jussieu, 75252 Paris Cedex 05,France.

*Primary Examiner* — Cephia D Toomer
*Assistant Examiner* — Vishal Vasisth

(57) ABSTRACT

The present invention is directed to Mannich condensation product sequestering agents or mixtures of Mannich condensation product sequestering agents for use in fuels and lubricating oils. The present invention is also directed to a process for preparing the Mannich condensation product sequestering agents. The present invention is also directed to a product formed by combining, under reaction conditions, a polyisobutyl-substituted hydroxyaromatic compound, an aldehyde, an amino acid or ester thereof, and an alkali metal base to form the Mannich condensation product sequestering agent. The present invention is also directed to a lubricating oil composition, a lubricating oil concentrate, a fuel composition, and a fuel concentrate having the Mannich condensation product sequestering agents of the present invention.

23 Claims, No Drawings

MANNICH CONDENSATION PRODUCTS USEFUL AS SEQUESTERING AGENTS

This application is a divisional of U.S. patent application Ser. No. 11/105,606, now U.S. Pat. No. 7,964,543, filed Apr. 13, 2005, the contents of which are incorporated herein by reference.

FIELD OF THE INVENTION

The present invention is directed to Mannich condensation product sequestering agents or mixtures of Mannich condensation product sequestering agents for use in fuels and lubricating oils. The present invention is also directed to a process for preparing the Mannich condensation product sequestering agents. The present invention is also directed to a product formed by combining, under reaction conditions, a polyisobutyl-substituted hydroxyaromatic compound, an aldehyde, an amino acid or ester thereof, and an alkali metal base to form the Mannich condensation product sequestering agent. The present invention is also directed to a lubricating oil composition, a lubricating oil concentrate, a fuel composition, and a fuel concentrate having the Mannich condensation product sequestering agents of the present invention.

BACKGROUND OF THE INVENTION

Lubricating oils contain additives that perform many important functions. Ashless dispersants are added to lubricating oils to disperse varnish, lacquer, and sludge that may be formed in the oil and prevent the formation of deposits. Ashless dispersants also disperse soot and prevent viscosity buildup caused by the agglomeration of soot in the oil. Overbased detergents are added to lubricating oils to neutralize acids. These acids can cause wear and corrosion, and can cause acid catalyzed reactions and rearrangements to occur in the oil. Anti-oxidants are added to lubricating oils to control oxidation of the oil by scavenging radicals or by decomposing hydroperoxides that are formed from the oxidation of the oil. Wear inhibitors are added to lubricating oils to prevent wear of the metal parts caused by friction. Other additives such as corrosion inhibitors, friction modifiers, viscosity index improvers, pour point depressants, seal, swell agents, etc., can also be added to lubricating oils to provide important properties to the finished lubricant.

Metal ions can play an important role in the deterioration of lubricating oils. Transition metals such as $Fe^{+3}$, $Cu^{+2}$, $Pb^{+2}$, and other metals, can catalyze the oxidation of the oil resulting in the formation of the primary oxidation products such as hydroperoxides, carboxylic acids, carbonyl compounds, hydroxyl carbonyl compounds, and the like. In addition, metal ions such as $Fe^{+3}$, $Cu^{+2}$, $Pb^{+2}$, and other metals, can catalyze the polymerization of the primary oxidation products resulting in the formation of sludge, lacquer, and varnish.

In order to prevent the metal catalyzed oxidation and polymerization of lubricating oils, it would be desirable to find a way to complex or sequester the metal ions and prevent the metal ions from acting as oxidation and polymerization catalysts.

Sequestering agents have many uses, in living plants for supplying necessary trace elements, in metal plating baths, removing rust stains, removing impurities and in fuels and lubricating oils. Most well known sequestering agents are useful only in aqueous media. There is a great need for good sequestering agents that are oil-soluble. Oil-soluble sequestering agents are also useful for the introduction of metals into non-aqueous systems, for providing oil-borne micro-nutrients to plants and many other uses known to persons skilled in the art. Oils useful for lubricating internal combustion engines are generally either mineral oils or synthetic oils of lubricating viscosity. Thus, sequestering agents for use in lubricating oils or hydrocarbon fuels must be oil-soluble.

The conventional oil-soluble Mannich condensation products are useful in internal combustion engine fuels. Non-volatile constituents of fuel, such as additives, sometimes form deposits or varnish on inlet valves and on heating elements. Such deposits and varnish impair the efficiency of these elements. In addition, fuels are susceptible to chemical reactions, such as, oxidation, on aging. One effect of oxidation is to produce soluble and insoluble materials that form deposits which interfere with the proper functioning of the internal combustion engines. The conventional oil-soluble Mannich condensation products help to reduce deposits.

Oil-soluble Mannich condensation products are also useful in internal combustion engine lubricating oils. These products generally act as dispersants to disperse sludge, varnish, and lacquer, and prevent the formation of deposits. In general, conventional oil-soluble Mannich condensation products are formed from the reaction of polyisobutyl-substituted phenols with formaldehyde and an amine or a polyamine. These products have limited ability to sequester $Fe^{+3}$ and have limited ability to prevent the $Fe^{+3}$ catalyzed oxidation and polymerization that often occur.

Water soluble Mannich condensation products are well known as sequestering agents. However, such products cannot be used as sequestering agents in fuels and lubricating oils.

The preparation of Mannich condensation products is well known in the art. A number of patents disclose Mannich condensation products of alkylphenols, aldehydes and amines. However, none of the known Mannich condensation products contain both the needed oil solubility and the ability to sequester $Fe^{+3}$ to prevent $Fe^{+3}$ catalyzed oxidation and polymerization reaction in lubricating oil.

U.S. Pat. No. 4,032,304 discloses an improved fuel composition containing a normally liquid fuel, a carboxylic acid ester of lubricating viscosity and an oil-soluble nitrogen-containing dispersant. The dispersant is characterized by the presence therein of a substantially saturated hydrocarbon-based radical having at least 50 carbon atoms. The dispersant is preferably a carboxylic dispersant or a Mannich-type dispersant. The Mannich-type dispersant is for example the reaction product of an alkylphenol with formaldehyde and a polyethylene polyamine.

U.S. Pat. No. 4,069,249 discloses a novel Mannich condensation product chelating agent for iron (III) or iron (II). The chelating agent is a Mannich condensation product made from phenol or substituted-phenol, formaldehyde, a di-amino di-acid and a di-amine. The process for making these Mannich condensation products is disclosed in U.S. Pat. No. 4,338,460.

U.S. Pat. No. 4,166,726 discloses a fuel additive and fuel composition. The additive compound is a mixture of a polyisobutylene amine and the reaction product of an alkylphenol, an aldehyde and an amine. The additive provides surprising stability in preventing thermal degradation of fuels, particularly fuels for compression ignition engines.

U.S. Pat. No. 4,116,991 discloses an aromatic chelating agent having a hydroxyl group at the center of the molecule. Such chelating agents have better stability in an alkaline environment.

U.S. Pat. No. 4,130,582 discloses a process for the preparation of phenolic ethylenediamine polycarboxylic acids in predominantly the ortho isomeric form which comprises reacting a phenol compound, ethylenediamine, glyoxylic acid and a base, said phenol compound functioning both as a reactant and as a solvent for the reaction system.

U.S. Pat. No. 4,197,091 discloses a composition for inhibiting the corrosion of ferrous metal pipelines used to transport petroleum hydrocarbons comprising a major portion of a mixture of $C_{36}$ di-carboxylic dimer acid and a $C_{54}$ trimer acid, which mixture has an acid number of at least 110 and from 0.5 up to 5% of a composition from the group consisting of (a) an N,N'-di(ortho-hydroxyarylidene)-1,2-alkyldiamine in which the arylidene radical contains 6-7 carbon atoms and the alkylene radical contains 2-3 carbon atoms; and (b) a polymeric condensation product obtained by the reaction of a phenol having two reactive ring positions, a lower aliphatic aldehyde and a polyamine.

U.S. Pat. No. 4,225,502, a division of application Ser. No. 630,792, U.S. Pat. No. 4,069,249 discussed above, discloses a novel Mannich condensation product chelating agent for iron (III) or iron (II). The chelating agent is a Mannich condensation product made from phenol or substituted-phenol, formaldehyde, a di-amino di-acid and a di-amine. The single claim is to a cyano-substituted compound.

U.S. Pat. No. 4,200,545 discloses combinations of amino phenols, wherein said phenols contain a substantially saturated hydrocarbon substituent of at least 10 aliphatic carbon atoms, and one or more detergent/dispersants selected from the group consisting of (I) neutral or basic metal salts of an organic sulfur acid, phenol or carboxylic acid; (II) hydrocarbyl-substituted amines wherein the hydrocarbyl substituent is substantially aliphatic and contains at least 12 carbon atoms; (III) acylated nitrogen-having compounds having a substituent of at least 10 aliphatic carbon atoms; and (IV) nitrogen-having condensates of a phenol, aldehyde and amino compound. Fuels and lubricants having such combinations as additives are particularly useful in two-cycle (two-stroke) engines.

U.S. Pat. No. 4,387,244 discloses that alkyl-substituted hydroxybenzyl amino acid oligomers are effective metal chelating agents in a broad range of non-aqueous systems. The products claimed display surprisingly high solubilities in a broad range of substituted and unsubstituted aliphatic and aromatic solvents.

U.S. Pat. No. 4,655,949 discloses a novel lubricating oil composition comprising an organometallic additive, including a metal selected from Groups I, Ib and VIII of the Periodic System of Elements, e.g. Na, K, Cu, Co, Ni or Fe, chelated with the reaction product of formaldehyde, an amino acid and a phenol, dissolved in a lubricating oil. Depending on the choice of metal, the above organometallic additive imparts rust inhibition, sludge dispersant, wear reduction and anti-oxidant properties to the said lubricating oil.

U.S. Pat. No. 4,734,212 discloses Bis-Mannich base deposit inhibitors; lubricating oil compositions having these inhibitors and a process for preparing these inhibitors.

U.S. Pat. No. 4,847,415 discloses certain Mannich reaction products (i.e. alkylated phenol, polyoxyalkylenediamine, and an aldehyde) which are used to deactivate iron species already present in hydrocarbon fluids. Left untreated, such iron species lead to decomposition resulting in the formation of gummy, polymer masses in the hydrocarbon liquid. The method for the preparation of these Mannich condensation products are claimed in the divisional U.S. Pat. No. 4,883,580.

U.S. Pat. No. 4,894,139 discloses certain Mannich reaction products formed from the reaction of an alkyl-substituted catechol, a polyamine and an aldehyde which are used to deactivate copper metal species contained in hydrocarbon fluids. Left untreated, such species lead to decomposition resulting in the formation of gummy, polymer masses in the hydrocarbon liquid.

U.S. Pat. No. 5,122,161 discloses a diesel fuel composition comprising (a) a major portion of a diesel fuel, and (b) a minor amount, as a diesel fuel injector detergent, of a glycolated Mannich coupled product of bis-polyisobutylene succinimide of a polyamine, prepared by: (i) reacting an alkylsuccinic acid anhydride with a polyamine to form a bis-succinimide; (ii) reacting the bis-succinimide with a phenol in the presence of an aldehyde to form a Mannich phenol coupled bis-succinimide product; (iii) glycolating the Mannich phenol coupled bis-succcinimide product with glycolic acid to form a glycolated Mannich phenol coupled bis-succinimide product; and (iv) recovering the glycolated Mannich phenol coupled bis-succinimide product.

U.S. Pat. No. 5,641,394 discloses a composition for use in deactivating iron species in hydrocarbon fluids, comprising the products resulting from the reaction of (I) a substituted-catechol, (II) a mixture of polyamines, and (III) an aldehyde. The composition also functions as an anti-oxidant in hydrocarbon fluids. The anti-oxidant function is separate from, and in addition to the metal deactivating properties of the invention. These functional properties of the invention can act either singly, or in concert, for stabilization of hydrocarbon fluids.

An article titled "Preparation of Amphiphilic Polyisobutylenes-b-polyethylenamines by Mannich Reaction. III. Synthesis of Polyisobutylenes-b-polyethylenamines," by J. D. Jamois, M. Tessier and E. Marechal, Journal of Polymer Science Part A: Polymer Chemistry, Vol. 31, 1959-1966 (1993) discloses preparation of copolymers associating alpha-phenololigoisobutylene and triethylenetetramine blocks in the same chain by reacting aqueous formaldehyde with alpha-phenololigoisobutylene and triethylenetetramine.

SUMMARY OF THE INVENTION

The present invention is directed to a Mannich condensation product sequestering agent or mixtures of Mannich condensation product sequestering agents for use in fuels and lubricating oils. The present invention is also directed to a method for preparing the Mannich condensation product sequestering agents. The present invention is also directed to a product formed by combining, under reaction conditions, a polyisobutyl-substituted hydroxyaromatic compound, an aldehyde, an amino acid or ester thereof, and an alkali metal base to form the Mannich condensation product sequestering agent. The present invention is also directed to a lubricating oil composition, a lubricating oil concentrate, a fuel composition, and a fuel concentrate having the Mannich condensation product sequestering agents of the present invention.

Accordingly, the present invention is directed to a Mannich condensation product prepared by the Mannich condensation of:

(a) a polyisobutyl-substituted hydroxyaromatic compound, wherein the polyisobutyl group is derived from polyisobutene containing at least about 50 weight percent methylvinylidene isomer and has a number average molecular weight in the range of from about 400 to about 5,000;

(b) an aldehyde;

(c) an amino acid or ester derivative thereof; and (d) an alkali metal base.

In another embodiment the present invention is directed to a Mannich condensation product prepared by the Mannich condensation of:

(a) a polyisobutyl-substituted hydroxyaromatic compound having the formula:

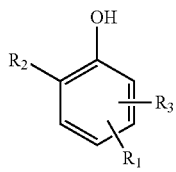

wherein $R_1$ is a polyisobutyl group derived from polyisobutene containing at least 50 weight percent methylvinylidene isomer and having a number average molecular weight in the range of about 400 to about 5,000, $R_2$ is hydrogen or lower alkyl having one carbon atom to about 10 carbon atoms, and $R_3$ is hydrogen or —OH;

(b) a formaldehyde or an aldehyde having the formula:

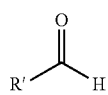

wherein R' is branched or linear alkyl having one carbon atom to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms;

(c) an amino acid or ester derivative thereof having the formula:

wherein W is —[CHR"]—$_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4, and A is hydrogen or alkyl having one carbon atom to about 6 carbon atoms; and (d) an alkali metal base.

In general, the principal Mannich condensation product of the invention can be represented by the formula:

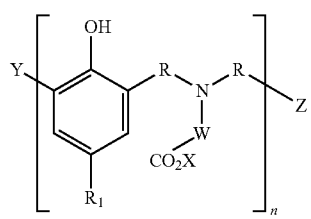

I wherein each R is independently —CHR'—, wherein R' is as defined above, $R_1$ is a polyisobutyl group derived from polyisobutene containing at least 50 weight percent methylvinylidene isomer and having a number average molecular weight in the range of about 400 to about 5,000;

X is hydrogen, an alkali metal ion or alkyl having one to about 6 carbon atoms;

W is —[CHR"]—$_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4;

Y is hydrogen, alkyl having one carbon atom to about 10 carbon atoms, —CHR'OH, wherein R' is as defined above, or

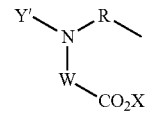

wherein Y' is —CHR'OH, wherein R' is as defined above; and R, X, and W are as defined above;

Z is hydroxyl, a hydroxyphenyl group of the formula:

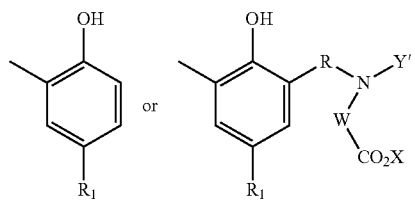

wherein R, $R_1$, Y', X, and W are as defined above, and n is an integer from 0 to 20, with the proviso that when n=0, Z must be:

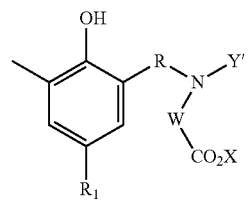

wherein R, $R_1$, Y', X, and W are as defined above.

Preferably the $R_1$ polyisobutyl group has a number average molecular weight of about 500 to about 2,500. More preferably the $R_1$ polyisobutyl group has a number average molecular weight of about 700 to about 1,500. Most preferably the $R_1$ polyisobutyl group has a number average molecular weight of about 700 to about 1,100.

Preferably the $R_1$ polyisobutyl group is derived from polyisobutene containing at least about 70 weight percent methylvinylidene isomer and more preferably the $R_1$ polyisobutyl group is derived from polyisobutene containing at least 90 weight percent methylvinylidene isomer.

In the compound of formula I above, preferably X is hydrogen, more preferably an alkali metal ion and most preferably a sodium ion.

In another embodiment of the invention, in the compound of formula I above, X is alkyl selected from methyl or ethyl.

In a preferred embodiment of the Mannich condensation product of the present invention R is $CH_2$, $R_1$ is derived from polyisobutene containing at least 50 weight percent methylvinylidene isomer and a number average molecular weight in the range of about 700 to about 1,100, W is $CH_2$; X is sodium ion and n is 0 to 20.

Another embodiment of the present invention is directed to a method for preventing metal ion catalyzed oxidation and polymerization reactions in a hydrocarbon medium comprising sequestering the metal ion by the addition of an effective amount of the Mannich condensation product of the present invention, as described above. The method for preventing metal ion catalyzed oxidation and polymerization reactions is particularly suitable for sequestering the metal ion by the addition of an effective amount of the Mannich condensation product of the present invention in engine oil.

The present invention is also directed to a product formed by combining, under reaction conditions, a polyisobutyl-substituted hydroxyaromatic compound, an aldehyde, an amino acid or amino acid ester, and an alkali metal base to form the Mannich condensation product sequestering agent.

Another embodiment of the present invention is directed to a process for preparing a Mannich condensation product comprising reacting a polyisobutyl-substituted hydroxyaromatic compound, wherein the polyisobutyl moiety is derived from polyisobutene containing at least 50 weight percent methylvinylidene isomer and a number average molecular weight in the range of about 400 to about 5,000, an aldehyde, an amino acid or amino acid ester and optionally a diluent, in the presence of a base.

Preferably the polyisobutyl-substituted hydroxyaromatic compound is polyisobutyl-substituted phenol wherein the polyisobutyl moiety is derived from polyisobutene containing at least 70 weight percent methylvinylidene isomer and more preferably the polyisobutyl moiety is derived from polyisobutene containing at least 90 weight percent methylvinylidene isomer.

Preferably the aldehyde is formaldehyde or paraformaldehyde. More preferably the aldehyde is paraformaldehyde.

Preferably the diluent is an alkanol having one carbon atom to about 10 carbon atoms. More preferably the alkanol is methanol.

Preferably the base is an alkali metal hydroxide. More preferably the alkali metal hydroxide is sodium hydroxide.

The amino acid or ester derivative thereof has the formula

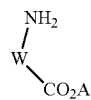

wherein W are as defined above and A is hydrogen or alkyl having one carbon atom to about 6 carbon atoms.

Preferably the amino acid is glycine.

In the above process the amino acid may be added in the form of its alkali metal ion salt. Preferably the alkali metal ion is a sodium ion or a potassium ion, more preferably the alkali metal ion is a sodium ion.

A further embodiment of the present invention is directed to a lubricating oil composition comprising a major amount of an oil of lubricating viscosity and a minor effective amount of one or more of the above described Mannich condensation products of the present invention.

A further embodiment of the present invention is directed to a lubricating oil concentrate comprising about 20 percent to 80 percent of a diluent oil of lubricating viscosity and an effective amount of one or more of the above described Mannich condensation products of the present invention. Both the lubricating oil composition and the lubricating oil concentrate may contain other additives designed to improve the properties of the lubricating oil.

A further embodiment of the present invention is directed to a fuel composition comprising a major amount of hydrocarbons boiling in the gasoline or diesel range and a minor effective amount of one or more of the above described Mannich condensation products of the present invention which has been further reacted to remove/replace any alkali metal. In general it is not desirable for a fuel additive composition to contain ash. Therefore, it is desirable to react the above described Mannich condensation products of the present invention in such a way that any alkali metal salt present is converted to an ammonium or other appropriate salt giving an ashless Mannich condensation product.

A further embodiment of the present invention is directed to a fuel concentrate comprising an inert stable oleophilic organic solvent boiling in the range of from about 65° C. to about 204° C. and from about 10 weight percent to about 90 weight percent of one or more of the above described Mannich condensation product of the present invention which has been further reacted to remove/replace any alkali metal present.

The Mannich condensation products of the present invention may also be employed as dispersants in lubricating oil. For use as dispersants in fuels the alkali metal ions in Mannich condensation products are replaced with ammonium ions.

Among other factors, the present invention is based upon the discovery that the Mannich condensation products of the present invention are effective in sequestering metals, especially $Fe^{+3}$, and preventing metal ion catalyzed oxidation and polymerization reactions, while maintaining sufficient oil solubility for use in lubricating oils and fuels.

DETAILED DESCRIPTION OF THE INVENTION

Definitions

As used herein, the following terms have the following meanings unless expressly stated to the contrary:

The term "aldehydes" as used herein refer to formaldehyde or aldehydes having the formula

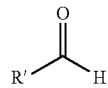

wherein R' is branched or linear alkyl having from one carbon atom to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms.

Representative aldehydes for use in the preparation of the Mannich condensation products of the present invention include, but are not limited to aliphatic aldehydes such as formaldehyde, acetaldehyde, propionaldehyde, butyraldehyde, valeraldehyde, caproaldehyde and heptaldehyde. Aromatic aldehydes are also contemplated for use in the preparation of the Mannich condensation products of the present invention, such as benzaldehyde and alkylbenzaldehyde. Para-tolualdehyde is an example of an alkylbenzaldehyde. Also useful are formaldehyde producing reagents, such as paraformaldehyde and aqueous formaldehyde solutions such as formalin. Aldehydes most preferred for use in the in the preparation of the Mannich condensation products of the present invention are paraformaldehyde and formalin.

Aldehydes most preferred for use in the in the preparation of the Mannich condensation products of the present invention are paraformaldehyde and formalin.

Preferably the aldehyde is formaldehyde. By formaldehyde is meant all its forms, including gaseous, liquid and solid. Examples of gaseous formaldehyde is the monomer $CH_2O$ and the trimer, $(CH_2O)_3$ (trioxane) having the formula given below.

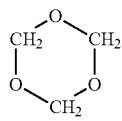

Examples of liquid formaldehyde are the following:
1. Monomer $CH_2O$ in ethyl ether.
2. Monomer $CH_2O$ in water which has the formulas $CH_2(H_2O)_2$ (methylene glycol) and $HO(-CH_2O)_n-H$.
3. Monomer $CH_2O$ in methanol which has the formulas $OHCH_2OCH_3$ and $CH_3O(-CH_2O)_n-H$.

Formaldehyde solutions are commercially available in water and various alcohols. In water it is available as a 37%-50% solution. Formalin is a 37% solution in water.

Formaldehyde is also commercially available as linear and cyclic (trioxane) polymers. Linear polymers may be low molecular weight or high molecular weight polymers.

The term "alkali metal" as used herein refers to Group I A metals of the Periodic Table, such as lithium, sodium and potassium.

The term "amino acid or ester derivative thereof" as used herein refers to amino acids having the formula

wherein W is $-[CHR'']-_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4, and A is hydrogen or alkyl having one carbon atom to about 6 carbon atoms. Preferably the alkyl is methyl or ethyl.

The term "amino acid salt" as used herein refers to salts of amino acids having the formula

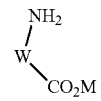

wherein W is as defined above and M is an alkali metal ion. Preferably M is a sodium ion or a potassium ion. More preferably X is a sodium ion.

The term "base" as used herein refers to alkali metal hydroxides and alkali metal alkoxides. Preferably the base is an alkali metal hydroxide selected from the group consisting of sodium hydroxide, lithium hydroxide or potassium hydroxide. More preferably the alkali metal hydroxide is sodium hydroxide or potassium hydroxide.

The term "color test" as used herein refers to the color test used for determination of the ability of the Mannich condensation products of the present invention to sequester $Fe^{+3}$ ions. The test is briefly described below:

Test for Iron Sequestering Ability

The test used for iron sequestering ability was as described in U.S. Pat. No. 4,387,244. A 0.15 to 0.25 gram sample of the Mannich condensation product is placed into an 8 dram vial to which is added 15 milliliters toluene and shaken to homogeneity. Next 15 milliliters 0 0.05 molar solution of $FeCl_3$ in water is added to the vial and the vial is mechanically shaken for one hour. The contents of the vial are allowed to separate and the toluene layer changes color from yellow to purple, as evidence of iron being chelated, in the presence of the Mannich condensation product sequestering agents of the present invention.

The term "hydroxyl number" as used herein refers to the amount of potassium hydroxide required to neutralize the polyisobutyl-substituted phenol per gram of sample (milligrams KOH per gram sample).

The term "inert stable oleophilic organic solvent" as used herein refers to solvents that dissolve in gasoline or diesel fuel. Preferably the inert stable oleophilic organic solvent is an aliphatic or an aromatic hydrocarbon solvent, such as benzene, toluene, xylene or higher-boiling aromatics or aromatic thinners. Aliphatic alcohols having from about 3 carbon atoms to about 8 carbon atoms may also be used in combination with the hydrocarbon solvents. Aliphatic alcohols contemplated for use in the present invention are isopropanol, isobutylcarbinol, n-butanol and the like.

The term "Mannich condensation product" as used herein refers to a mixture of products obtained by the condensation of a polyisobutyl-substituted hydroxyaromatic compound with an aldehyde and an amino acid, such as, glycine, to form condensation products having the formulas given below. The formulas given below are provided only as some examples of the Mannich condensation products believed to be of the present invention and are not intended to exclude other possible Mannich condensation products that may be formed using the methods of the present invention.

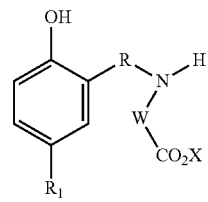

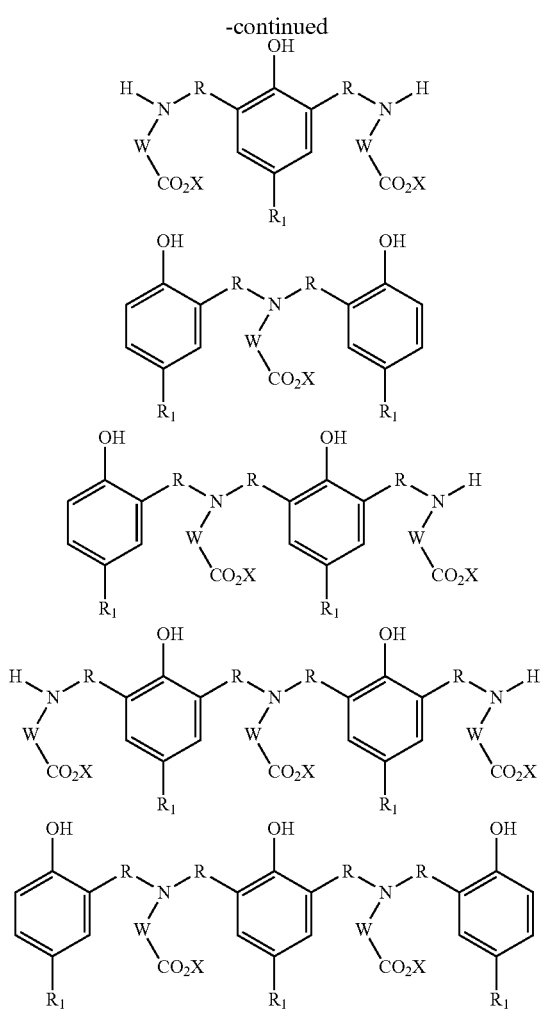

wherein R, $R_1$, X and W are as defined above.

The Mannich condensation products shown above may react further with an aldehyde and an amino acid to form larger oligomers.

Preferably the $R_1$ polyisobutyl group is derived from polyisobutene containing at least 70 weight percent methylvinylidene isomer and more preferably the $R_1$ polyisobutyl group is derived from polyisobutene containing at least 90 weight percent methylvinylidene isomer.

In a preferred embodiment of the Mannich condensation products R is $CH_2$, $R_1$ is derived from polyisobutene containing at least 50 weight percent methylvinylidene isomer and has a number average molecular weight of about 700 to about 1300, W is $CH_2$, and X is a sodium ion.

The term "oil of lubricating viscosity" as used herein refers to lubricating oils which may be mineral oil or synthetic oils of lubricating viscosity and preferably useful in the crankcase of an internal combustion engine. Crankcase lubricating oils ordinarily have a viscosity of about 1300 centistokes at −17.8° C. to 22.7 centistokes at 98.9° C. The lubricating oils may be derived from synthetic or natural sources. Mineral oil for use as the base oil in this invention includes paraffinic, naphthenic and other oils that are ordinarily used in lubricating oil compositions. Synthetic oils include hydrocarbon synthetic oils, synthetic esters and Fischer-Tropsch derived base oil. Useful synthetic hydrocarbon oils include liquid polymers of alpha-olefins having the proper viscosity. Especially useful are the hydrogenated liquid oligomers of $C_6$ to $C_{12}$ alpha-olefins such as 1-decene trimer. Similarly, alkyl benzenes of proper viscosity, such as didodecyl benzene, may be used. Useful synthetic esters include the esters of both monocarboxylic acids and polycarboxylic acids as well as monohydroxy alkanols and polyols. Typical examples are didodecyl adipate, pentaerthritol tetracapoate, di-2-ethylhexyl adipate, di-laurylsebacate and the like. Complex esters prepared from mixtures of mono- and di-carboxylic acid and mono- and di-hydroxy alkanols can also be used. Blends of hydrocarbon oils and synthetic oils may also be used. For example, blends of 10 weight percent to 25 weight percent hydrogenated 1-decene trimer with 75 weight percent to 90 weight percent 683 centistokes at 37.8° C. mineral oil gives an excellent oil base.

The term "polyisobutyl or polyisobutyl substituent" as used herein refers to the polyisobutyl substituent on the hydroxyaromatic ring. The polyisobutyl substituent has a number average molecular weight in the range of about 400 to about 5,000. Preferably the polyisobutyl moiety has a number average molecular weight in the range of about 500 to about 2,500. More preferably the polyisobutyl moiety has a number average molecular weight in the range of about 700 to about 1,500, and most preferably the polyisobutyl moiety has a number average molecular weight in the range of about 700 to about 1,100.

Preferably the attachment of the polyisobutyl substituent to the hydroxyaromatic ring is para to the hydroxyl moiety in at least 60 percent of the total polyisobutyl-substituted phenol molecules, more preferably the attachment of the polyisobutyl substituent to the hydroxyaromatic ring is para to the hydroxyl moiety in at least 80 percent of the total polyisobutyl-substituted phenol molecules, and most preferably the attachment of the polyisobutyl substituent to the hydroxyaromatic ring is para to the hydroxyl moiety on the phenol ring in at least 90 percent of the total polyisobutyl-substituted phenol molecules.

The term "polyisobutyl-substituted phenol" as used herein refers to a polyisobutyl-substituted phenol ring. The polyisobutyl-substituted phenol is derived from polyisobutene containing at least 50 weight percent methylvinylidene isomer. Preferably the polyisobutyl-substituted phenol is derived from polyisobutene containing at least about 70 weight percent methylvinylidene isomer and more preferably the polyisobutyl-substituted phenol is derived from polyisobutene containing at least about 90 weight percent methylvinylidene isomer.

The term "sequestering agent(s)" as used herein refers to compounds that hold a metal atom between two or more atoms of a single molecule of the compound, thereby neutralizing or controlling harmful metal ions, such as $Fe^{+3}$, in a lubricating oil or fuel.

The term "VW TDI-1 and VW TDI-2 engine tests" as used herein refers to the engine test procedures CEC L-78-T-97 and CEC L-78-T-99 respectively, published by the Coordinating European Council (CEC) for the Development of Performance Tests for Transportation Fuels, Lubricants and Other Fluids.

Unless otherwise specified, all percentages are in weight percent and the pressure is atmospheric pressure.

The Mannich Condensation Product

In its broadest aspects the present invention is directed to a Mannich condensation product prepared by the Mannich condensation of a polyisobutyl-substituted hydroxyaromatic compound, wherein the polyisobutyl group has number average molecular weight in the range of from about 400 to about 5,000, an aldehyde, an amino acid or ester derivative thereof, and an alkali metal base.

General Procedure for Preparation of Mannich Condensation Product Sequestering Agents The Mannich condensation products of this invention are prepared by combining under reaction conditions a polyisobutyl-substituted hydroxyaromatic compound, wherein the polyisobutyl group has a number average molecular weight in the range of from about 400 to about 5,000, an aldehyde, an amino acid or ester derivative thereof, and an alkali metal base. The reaction can be carried out batch wise, or in continuous or semi-continuous mode.

Normally the pressure for this reaction is atmospheric, but the reaction may be carried out under sub atmospheric or super atmospheric pressure if desired.

The temperature for this reaction may vary widely. The temperature range for this reaction can vary from 10° C. to about 200° C., preferably from about 50° C. to about 150° C., more preferably from about 70° C. to about 130° C.

The reaction may be carried out in the presence of a diluent or a mixture of diluents. It is important to ensure that the reactants come into intimate contact with each other in order for them to react. This is an important consideration because the starting materials for the Mannich condensation products of the present invention include the relatively non polar polyisobutyl-substituted hydroxyl aromatic compounds and the relatively polar amino acid or ester derivative thereof. It is therefore necessary to find a suitable set of reaction conditions or diluents that will dissolve all the starting materials diluents for this reaction must be capable of dissolving the starting materials of this reaction and allowing the reacting materials to come in contact with each other. Mixtures of diluents can be used for this reaction. Useful diluents for this reaction include water, alcohols, (including methanol, ethanol, isopropanol, 1-propanol, 1-butanol, isobutanol, sec-butanol, butanediol, 2-ethylhexanol, 1-pentanol, 1-hexanol, ethylene glycol, and the like), DMSO, NMP, HMPA, cellosolve, diglyme, various ethers (including diethyl ether, THF, diphenylether, dioxane, and the like), aromatic diluents (including toluene, benzene, o-xylene, m-xylene, p-xylene, mesitylene and the like), esters, alkanes (including pentane, hexane, heptane, octane, and the like), and various natural and synthetic diluent oils (including 100 neutral oils, 150 neutral oils, polyalphaolefins, Fischer-Tropsch derived base oil and the like, and mixtures of these diluents. Mixtures of diluents that form two phases such as methanol and heptane are suitable diluents for this reaction.

The reaction may be carried out by first reacting the hydroxyaromatic compound with the alkali metal base, followed by the addition of the amino acid or ester derivative thereof and the aldehyde, or the amino acid or ester derivative thereof may be reacted with the aldehyde followed by the addition of the hydroxyaromatic compound and the alkali metal base, etc.

It is believed that the reaction of the amino acid, such as glycine, or ester derivative thereof, plus the aldehyde, such as formaldehyde, may produce the intermediate formula

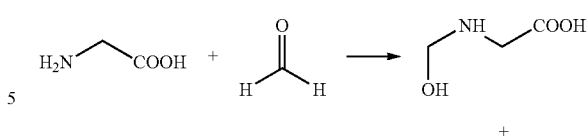

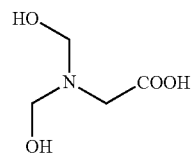

which may ultimately form the cyclic formula

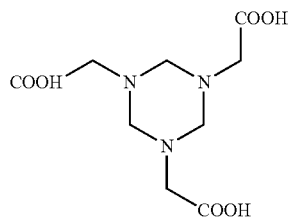 [SMILES: O=C(O)CN1CN(CC(=O)O)CN(CC(=O)O)C1]

It is believed that these intermediates may react with the hydroxyaromatic compound and the base to form the Mannich condensation products of the present invention.

Alternatively, it is believed that the reaction of the hydroxyaromatic compound with the aldehyde may produce the intermediate formula

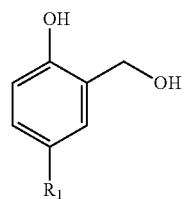

It is also believed that this intermediate may react with the amino acid or ester derivative thereof and the base to form the Mannich condensation product of the present invention.

The time of the reaction can vary widely depending on the temperature. The reaction time can vary between 0.1 hour to about 20 hours, preferably from about 2 hours to about 10 hours, more preferably from about 3 hours to about 7 hours.

The charge mole ratio (CMR) of the reagents can also vary over a wide range. Table I below gives a listing of the different formulae that can arise if different charge mole ratios are used. At a minimum the oil-soluble Mannich condensation products that sequester $Fe^{+3}$ should preferable contain at least one polyisobutyl-substituted phenol ring and one amino acid group connected by one aldehyde group and one alkali metal. The polyisobutyl-substituted phenol/aldehyde/amino acid/base charge mole ratio for this molecule, also shown in Table I below, is 1.0:1.0:1.0:1.0. Other charge mole ratios are possible and the use of other charge mole ratios can lead to the production of different molecules of different formulas.

TABLE I

| Product | Polyisobutyl-substituted phenol:aldehyde:amino acid:base (CMR) |
|---|---|
| 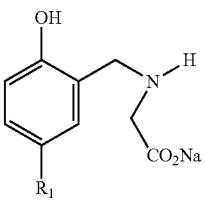 | 1.0:1.0:1.0:10 |
| 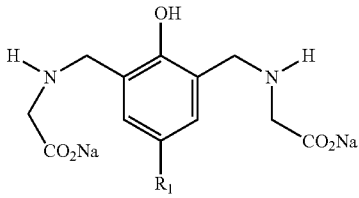 | 1.0:2.0:2.0:2.0 |
| 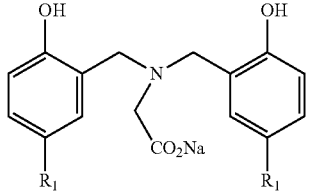 | 2.0:2.0:1.0:1.0 |
| 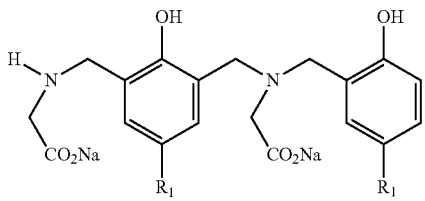 | 2.0:3.0:2.0:2:0 |
| 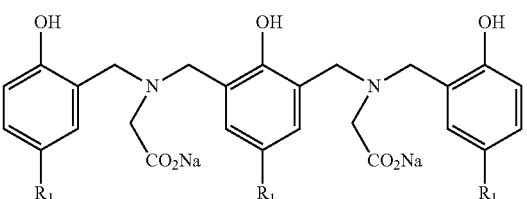 | 3.0:4.0:2.0:2.0 |

All these products arising from other charge mole ratios may all be present alone, as a single component, or as combinations of several components in a complex mixture of products.

In the broadest sense the polyisobutyl-substituted phenol: aldehyde: amino acid: base CMR can vary from 1.0 to 20.0: 1.0 to 39.0:1.0 to 20.0:1.0 to 4.0. Preferably the polyisobutyl-substituted phenol: aldehyde: amino acid: base CMR can vary from 1.0 to 5.0:1.0 to 10.0:1.0 to 6.0:1.0 to 3.0. More preferably the polyisobutyl-substituted phenol: aldehyde: amino acid: base CMR can vary from 1.0 to 3.0:1.0 to 5.0:1.0 to 3.0:1.0 to 2.0. Most preferably the polyisobutyl-substituted phenol: amino acid: aldehyde: base CMR is 1:1:2:1.

Compounds suitable for use in the preparation of the Mannich condensation products of the present invention are given below:

Polyisobutyl-Substituted Hydroxyaromatic Compound

A variety of polyisobutyl-substituted hydroxyaromatic compounds can be utilized in the preparation of the Mannich condensation products of this invention. The critical feature is that the polyisobutyl substituent be large enough to impart oil solubility to the finished Mannich condensation product. In general the number of carbon atoms on the polyisobutyl substituent group that are required to allow for oil solubility of the Mannich condensation product is on the order of about $C_{20}$ and higher. This corresponds to a molecular weight in the range of about 400 to about 5,000. It is desirable that the $C_{20}$ or higher alkyl substituent on the phenol ring be located in the position para to the OH group on the phenol.

In general, one unsubstituted carbon atom in the ortho position to the hydroxyl group on the aromatic ring is required in order to prepare the Mannich condensation products of this invention. For example, phenol substituted in the para position with a polyisobutyl substituent that contains 20 or more carbon atoms is a preferred polyisobutyl-substituted phenol raw material for this invention.

Di-substituted phenols are also suitable starting materials for the Mannich condensation products of this invention.

Di-substituted phenols are suitable provided that they are substituted in such a way that there is an unsubstituted ortho position on the phenol ring. Examples of suitable di-substituted phenols are o-cresol derivatives substituted in the para position with a $C_{20}$ or greater polyisobutyl substituent and the like.

A preferred polyisobutyl-substituted phenol has the following formula:

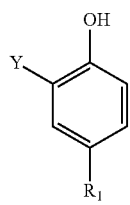

wherein R1 is polyisobutyl group derived from polyisobutene containing at least 50 weight percent methylvinylidene isomer and having a number average molecular weight in the range of about 400 to about 5,000, and Y is hydrogen.

In the above process the polyisobutyl substituent on the polyisobutyl-substituted phenol has a number average molecular weight in the range of about 400 to about 5,000. Preferably the polyisobutyl substituent on the polyisobutyl-substituted phenol has a number average molecular weight of about 500 to about 2,5000. More preferably the polyisobutyl substituent on the polyisobutyl-substituted phenol has a number average molecular weight of about 700 to about 1,500. Most preferably the polyisobutyl substituent on the polyisobutyl-substituted phenol has a number average molecular weight of about 700 to about 1,100.

The polyisobutyl-substituted phenol in the above process is preferably derived from polyisobutene containing at least about 50 weight percent methylvinylidene isomer. More preferably the polyisobutyl-substituted phenol is derived from polyisobutene containing at least about 70 weight percent methylvinylidene isomer and most preferably the polyisobutyl-substituted phenol is derived from polyisobutene containing at least about 90 weight percent methylvinylidene isomer.

Suitable polyisobutenes may be prepared using boron trifluoride ($BF_3$) alkylation catalyst as described in U.S. Pat. Nos. 4,152,499 and 4,605,808.

Commercially available polyisobutenes having a high alkylvinylidene content include Glissopal® 1000, 1300 and 2300, available from BASF.

The preferred polyisobutyl-substituted phenol for use in the preparation of the Mannich condensation products of the present invention is a mono-substituted phenol, wherein the polyisobutyl substituent is attached at the para-position to the phenol ring. However, other polyisobutyl-substituted phenols that may undergo the Mannich condensation reaction may also be used for preparation of the Mannich condensation products of the present invention.

Solvent

Solvents may be employed to facilitate handling and reaction of the polyisobutyl-substituted phenols in the preparation of the Mannich condensation products of the present invention. Examples of suitable solvents are hydrocarbon compounds such as heptane, benzene, toluene, chlorobenzene, aromatic solvent, neutral oil of lubricating viscosity, paraffins and naphthenes. Examples of other commercially available suitable solvents that are aromatic mixtures include Chevron® Aromatic 100N, neutral oil, Exxon® 150N, neutral oil.

If the Mannich condensation product sequestering agent prepared by the above process is to be used as an additive in lubricating oil, then the polyisobutyl-substituted phenol may be first dissolved in an alkyl-substituted aromatic solvent. Preferably the alkyl substituent on the aromatic solvent has from about 3 carbon atoms to about 15 carbon atoms. More preferably the alkyl substituent on the aromatic solvent has from about 6 carbon atoms to about 12 carbon atoms.

Base

Typical bases include alkali metal hydroxides and alkali metal alkoxides. Preferably the base is an alkali metal hydroxide selected from the group consisting of sodium hydroxide, lithium hydroxide or potassium hydroxide. More preferably the alkali metal hydroxide is sodium hydroxide or potassium hydroxide. Most preferably the base is sodium hydroxide. If the Mannich condensation product sequestering agent is to be used as a fuel additive it may be desirable to replace the alkali metal ion on the Mannich condensation products with an ammonium ion. For other uses the alkali metal ion on the Mannich condensation products may also be replaced with Group II metals of the Periodic Table.

Aldehyde

Aldehydes contemplated for use in the process of the present invention are formaldehyde or aldehydes having the formula

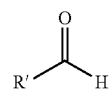

wherein R' is branched or linear alkyl, having from one carbon atom to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms.

Representative aldehydes for use in the preparation of the Mannich condensation products of the present invention include, but are not limited to aliphatic aldehydes such as formaldehyde, acetaldehyde, propionaldehyde, butyraldehyde, valeraldehyde, caproaldehyde and heptaldehyde.

Aromatic aldehydes are also contemplated for use in the preparation of the Mannich condensation products of the present invention, such as benzaldehyde, alkylbenzaldehyde and hydroxybenzaldehyde. Para-tolualdehyde is an example of an alkylbenzaldehyde.

Also useful are formaldehyde producing reagents, such as paraformaldehyde and aqueous formaldehyde solutions such as formalin. Aldehydes most preferred for use in the in the preparation of the Mannich condensation products of the present invention are paraformaldehyde and formalin.

Aldehydes most preferred for use in the in the preparation of the Mannich condensation products of the present invention are paraformaldehyde and formalin.

Preferably the aldehyde is formaldehyde. By formaldehyde is meant all its forms, including gaseous, liquid and solid. Examples of gaseous formaldehyde is the monomer $CH_2O$ and the trimer, $(CH_2O)_3$ (trioxane) having the formula given below.

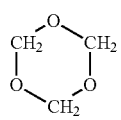

Examples of liquid formaldehyde are the following:

4. Monomer $CH_2O$ in ethyl ether.
5. Monomer $CH_2O$ in water which has the formulas $CH_2(H_2O)_2$ (methylene glycol) and $HO(-CH_2O)_n-H$.
6. Monomer $CH_2O$ in methanol which has the formulas $OHCH_2OCH_3$ and $CH_3O(-CH_2O)_n-H$.

Formaldehyde solutions are commercially available in water and various alcohols. In water it is available as a 37%-50% solution. Formalin is a 37% solution in water.

Formaldehyde is also commercially available as linear and cyclic (trioxane) polymers. Linear polymers may be low molecular weight or high molecular weight polymers.

Amino Acid

The amino acid or the ester derivative thereof used in the above process has the formula

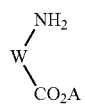

W is $-[CHR'']-_m$ wherein each R'' is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4 and A is hydrogen or alkyl having one carbon atoms to about 6 carbon atoms.

Preferably A is hydrogen in the above formula. The preferred alkyl in the above formula is methyl or ethyl.

Preferably the amino acid is glycine.

Some examples of alpha amino acids contemplated for use in the preparation of the Mannich condensation products of the present invention are given below in Table II.

TABLE II

| Name | Formula | $K^{25°\ C.,\ 0\ Ionic}_{strength}$ |
|---|---|---|
| Alanine | $H_3C-\underset{\underset{OH}{\overset{\|}{C=O}}}{\overset{NH_2}{\overset{\|}{CH}}}$ | 9.87 |
| Arginine | $H_2N-\underset{NH}{\overset{H}{\overset{\|}{C}}}-N-\overset{H_2}{C}-\overset{H_2}{C}-\overset{H_2}{C}-\underset{\underset{OH}{\overset{\|}{C=O}}}{\overset{NH_2}{\overset{\|}{CH}}}$ | 8.99 |

TABLE II-continued

| Name | Formula | $K^{25°\ C.,\ 0\ Ionic}_{strength}$ |
|---|---|---|
| Asparagine | Asparagine structure | 8.72 * |
| Aspartic Acid | Aspartic acid structure | 10.0 |
| Cysteine | Cysteine structure | 10.77 |
| Cystine | Cystine structure | 8.80 ** |
| Glutamic Acid | Glutamic acid structure | 9.95 |
| Glutamine | Glutamine structure | 9.01* |
| Glycine | Glycine structure | 9.78 |
| Histidine | Histidine structure | 9.08* |
| Hydroxylysine | Hydroxylysine structure | |

TABLE II-continued

| Name | Formula | $K^{25°}$ | $\text{Log } C$, $^0$ Ionic strength |
|---|---|---|---|
| Isoleucine | 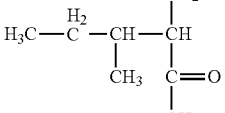 | | 9.75 |
| Leucine | 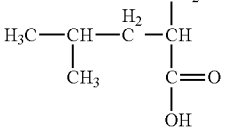 | | 9.75 |
| Lysine | 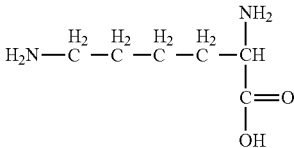 | | 10.69* |
| Methionine | 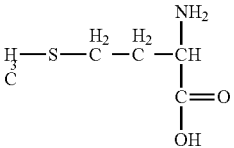 | | 9.05 |
| Phenylalanine | 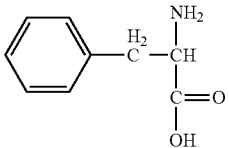 [SMILES: NC(Cc1ccccc1)C(=O)O] | | 9.31 |
| Serine | 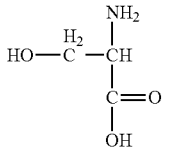 | | 9.21 |
| Threonine | 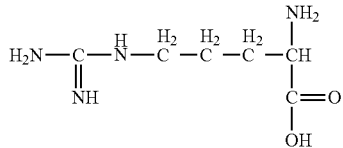 | | 9.10 |
| Tyrosine | 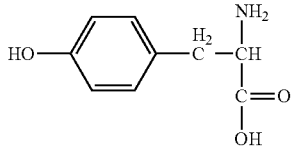 [SMILES: NC(Cc1ccc(O)cc1)C(=O)O] | | 10.47 |
| Valine | 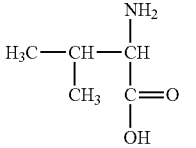 | | 9.72 |

*0.1 ionic strength.
**20° C. and 0.1 ionic strength.

The present invention is also directed to a lubricating oil additive composition comprising a major amount of an oil of lubricating viscosity and a minor amount of the Mannich condensation product sequestering agent of the present invention. A mixture of Mannich condensation product sequestering agents are also contemplated in the lubricating oil additive composition of the present invention. Typically the lubricating oil composition will contain Mannich condensation product sequestering agents of this invention in the range of from about 0.01 weight percent to about 10 weight percent, preferably in the range of from about 0.1 weight percent to about 5 weight percent and more preferably in the range of from about 0.3 weight percent to about 2 weight percent. The lubricating oil additive composition will generally contain other additives including detergents (overbased and non-overbased), dispersants, extreme pressure agents, wear inhibitors, rust inhibitors, foam inhibitors, corrosion inhibitors, pour point depressants, antioxidants, zinc di-thiophosphates and a variety of other well known additives.

The present invention is also directed to a lubricating oil concentrate. Lubricating oil additive concentrates usually include from 90 weight percent to 10 weight percent of an organic liquid diluent and from 10 weight percent to 90 weight percent (on a dry polymer basis) of the additive of this invention. Typically, the concentrates contain sufficient diluent to make them easy to handle during shipping and storage. Generally, the lubricating oil concentrate will contain the Mannich condensation product sequestering agents of this invention in the range of from about 10 weight percent to about 90 weight percent dry polymer Mannich condensation product, preferably in the range of from about 30 weight percent to about 70 weight percent dry polymer Mannich condensation product, and more preferably about 50 weight percent dry polymer Mannich condensation product.

The present invention is also directed to a fuel additive composition comprising a major amount of hydrocarbons boiling in the gasoline or diesel range and a minor effective amount of the Mannich condensation product sequestering agent of the present invention. A mixture of Mannich condensation product sequestering agents are also contemplated in the fuel composition of the present invention. Typically the fuel composition will contain the Mannich condensation product sequestering agents of this invention in the range of from about 25 parts per million to about 2,500 parts per million, preferably in the range of from about 50 parts per million to about 1,500 parts per million, and more preferably in the range of from about 70 parts per million to about 1,000 parts per million, The gasoline fuel additive composition of the present invention may include other fuel additives, including oxygenates, anti-knock agents, dispersants, detergents, lead scavengers, anti-oxidants, pour point depressants, corrosion inhibitors and demulsifiers. The gasoline fuels may also contain amounts of other fuels, for example, methanol. The diesel fuel additive composition of the present invention may also contain other additives, including pour point depressants, flow improvers and cetane improvers. The diesel fuels may also contain amounts of other fuels, for example, methanol.

A further embodiment of the present invention is also directed to a fuel concentrate comprising an inert stable oleophilic organic solvent boiling in the range of from about 65° C. to about 204° C. and from about 10 weight percent to about 90 weight percent of one or more Mannich condensation product sequestering agents of the present invention. Generally the fuel concentrate will contain Mannich condensation product sequestering agents of the present invention in the range of from about 10 weight percent to about 70 weight percent, preferably in the range of from about 10 weight percent to about 50 weight percent and more preferably in the range of from about 20 weight percent to about 40 weight percent.

A fuel-soluble, non-volatile carrier fluid or oil may also be used with the fuel additive composition of this invention. The carrier fluid is a chemically inert hydrocarbon-soluble liquid vehicle which substantially increases the non-volatile residue, or the solvent-free liquid fraction of the fuel additive composition while not overwhelmingly contributing to octane requirement increase. The carrier fluid may be a natural or a synthetic oil, such as mineral oil or refined petroleum oils.

Typically, an engine lubricating oil composition may contain the following components:
(a) A major amount of oil of lubricating viscosity;
(b) 0.01 weight percent to 10.0 weight percent of at least one Mannich condensation product of the present invention;
(c) 1.0 weight percent to 10.0 weight percent of at least one borated or non-borated succinimide ashless detergent;
(d) 0.05 weight percent to 0.5 weight percent, as calcium, of at least one calcium sulfonate, phenate or salicylate detergent;
(e) 0.02 weight percent to 0.2 weight percent, as phosphorus, of at least one secondary or mixture of primary and secondary alkyl zinc dithiophosphate;
(f) 0.0 weight percent to 5.0 weight percent of at least one diphenyl amine oxidation inhibitor;
(g) 0.0 weight percent to 0.5 weight percent of, as molybdenum, of at least one molybdenum succinimide oxidation inhibitor;
(h) 0.0 weight percent to 5.0 weight percent of at least one partial; carboxylic ester or borated ester friction modifier;
(i) 0.0 weight percent to 0.05 weight percent of at least one supplemental anti-wear/extreme pressure agent, such as molybdenum dithiocarbamate;
(j) 0.0 weight percent to 0.1 weight percent of at least one foam inhibitor; and
(k) 0.0 weight percent to 2.0 weight percent of at least one olefin copolymer viscosity index improver.

The Mannich condensation products of the present invention may also be employed as dispersants in lubricating oil. For use as dispersants in fuels the alkali metal ions in Mannich condensation products are replaced with ammonium ions.

EXAMPLES

Example 1

Preparation of Mannich Condensation Product Using 1,000 Molecular Weight Polyisobutyl-Substituted Phenol To a 1.0 liter three-neck flask equipped with a temperature probe, mechanical stirrer and reflux condenser were added 4.0 grams of sodium hydroxide in 3.0 milliliters of water (0.1 moles), 300 milliliters of methanol (boiling point 65° C.), 7.5 grams (0.1 moles) of glycine and 6.59 grams (0.2 moles) of paraformaldehyde. The reaction mixture was gently warmed (40° C.) for 30 minutes. To this was added, at a reflux temperature, 134.8 grams (0.1 moles) of 1,000 molecular weight polyisobutyl-substituted phenol, prepared as described in U.S. Pat. Nos. 5,300,701 and 6,274,777, (hydroxyl number 41.6 milligrams KOH per gram sample) diluted in $C_9$ aromatic solvent The reaction mixture was heated at reflux temperature for 17 hours. Next the methanol was removed under vacuum and the product obtained.

This product was soluble in diluent oil. The product had a viscosity of 1,653 centistokes at 100° C.

Comparative Example A

Preparation of Mannich Condensation Product Using $C_{12}$ Alkyl Substituted Phenol To a 2.0 liter three-neck flask equipped with a temperature probe, mechanical stirrer and reflux condenser were added 40 grams of sodium hydroxide in 20 milliliters of water (0.1 moles) and 700 milliliters of methanol (boiling point 65° C.). The reaction mixture was heated gently (40° C.) for 15 minutes to dissolve the sodium hydroxide. To the reaction mixture was added 75.07 grams (1.0 mole) of glycine and 60.06 grams (2.0 moles) of paraformaldehyde with gentle heating (40° C.). To this was added 286.29 grams (0.1 moles) of $C_{12}$ propylene tetramer substituted phenol, OLOA 200® (hydroxyl number 196 milligrams KOH per gram sample), available from Chevron Oronite Company LLC. The reaction mixture was heated at reflux temperature for 17 hours. Next the methanol was removed under vacuum. The product obtained was dissolved in toluene. The product had to be dissolved in toluene because it was only slightly soluble in hexane. The product was filtered through Celite® and the solvent (toluene) removed under vacuum and the product was obtained.

Comparative Example B

Solubility of Mannich Condensation Product Prepared from $C_9$ Alkyl Substituted Phenol Mannich condensation product, 15.1 grams, was prepared from $C_9$ alkyl-substituted phenol as described in U.S. Pat. No. 4,387,244. The product was dissolved in 50 milliliters toluene at elevated temperature (100° C.). To this was added 35 grams Citcon® 100N, neutral diluent oil. Next most of the toluene was removed under vacuum. A total of 52 grams of product (30 product and 70 percent diluent oil) was obtained. The product was cloudy indicating that Mannich condensation product was poorly soluble in diluent oil.

Example 2

High Temperature PCDO Performance VW TDI-1 Engine Test Using 10w40 Oil

The performance of a sample of the Mannich condensation product prepared in Example 1 was evaluated in a VW TD-1 Engine Test and compared to a fully formulated oil without the Mannich condensation product. The product prepared in Example 1 was added at a 1.0 percent treat rate to a fully formulated oil containing typical amounts of ashless dispersant, phenate, overbased sulfonate, LOB sulfonate zinc dithiophosphate, wear inhibitors, etc., in a SAE grade 10w40, partial synthetic oil. The results of the VW TDI-1 Engine Test are summarized below in Table II. The data show that the oil containing the Mannich condensation product of the present invention had significantly better performance that the baseline oil. The baseline oil ran for only 42 hours and was terminated early. The average piston merit was 60.6, and the average ring sticking was 2.0. This was a failing engine test. The oil containing the Mannich condensation product of the present invention completed the 60 hour test and gave average piston merit of 66.7, and average ring sticking of 0.63. This was a passing engine test result. It is believed that the oil containing the Mannich condensation product of the present invention performed better than the baseline oil alone because of the Mannich condensation product's ability to sequester metal ions, thus preventing metal ion catalyzed oxidation and polymerization reactions from occurring.

TABLE II

| Example | Test Hours | Average Piston Merit | Average Ring Sticking |
|---|---|---|---|
| Baseline | 42 | 60.6 | 2.00 |
| Example 2 | 60 | 66.7 | 0.63 |

Example 3

High Temperature PCDO Performance VW TDI-2 Engine Test Using 5w30 Oil

The performance of a sample of the Mannich condensation product, prepared in Example 1 dissolved at 1.0 percent level in a fully formulated Group III 5w30 baseline oil, was determined in a VW TD-2 Engine Test. This was compared to the baseline oil without the Mannich condensation product. The results of the VW TDI Engine Test are summarized below in Table III. The data show that the oil containing the Mannich condensation product of the present invention had significantly better performance than the baseline. The oil containing the Mannich condensation product of the present invention performed better for average piston cleanliness and there was no ring sticking. It is believed that the Mannich condensation product of the present invention performed better than the Group III Base Oil alone because of the product's ability to sequester metal ions, thus preventing metal ion catalyzed oxidation and polymerization reactions in the hydrocarbon base oil.

TABLE III

| Example | Test Hours | Average Piston Merit | Average Ring Sticking |
|---|---|---|---|
| Baseline | 54 | 55 | none |
| Example 3 | 54 | 60 | none |

Example 4

High Temperature PCDO Performance VW TDI-2 Engine Test Using 10w40 Oil

The performance of a sample of the Mannich condensation product, prepared in Example 1 dissolved at 1.0 percent level in a fully formulated 5w40 baseline oil, was measured in a VW TD-2 Engine Test. This was compared to the baseline oil without the Mannich condensation product. The results of the VW TDI Engine Test are summarized below in Table IV. The data show that the oil containing the Mannich condensation product of the present invention had significantly better performance than the baseline. The oil containing the Mannich condensation product of the present invention performed better for, average piston merit and average ring sticking, than the baseline. It is believed that the oil containing the Mannich condensation product of the present invention performed better than the baseline because of the product's ability to sequester metal ions, thus preventing metal ion catalyzed oxidation and polymerization reactions in the hydrocarbon base oil.

TABLE IV

| Example | Test Hours | Average Piston Merit | Average Ring Sticking |
|---|---|---|---|
| Baseline | 54 | 42 | 1.875 |
| Example 4 | 54 | 54.8 | 0.625 |

Example 5

Preparation of Mannich Condensation Product Using 550 Molecular Weight Polyisobutyl-Substituted Phenol To a 2 liter 3 neck glass round bottom flask equipped with a reflux condenser, nitrogen inlet, mechanical stirrer, heating mantle, and thermocouple, was added NaOH, 8.00 grams (50 percent aqueous solution), (0.10 moles) and 300 milliliters methanol. This was stirred and heated to about 50° C. for 15 minutes. To this was added glycine, 7.51 grams (0.100 moles) and paraformaldehyde, 6.59 grams 0.220 moles. The solution was then heated to reflux and to this was added 66.50 grams (0.101 moles) polyisobutyl-substituted phenol (prepared using the procedure described in U.S. Pat. Nos. 5,300,701 and 6,274,777 using Glissopal®, $M_n$=550, methylvinylidene content greater than 50 weight percent). This was heated at reflux for 20 hours. The resulting oil and methanol phases were dissolved in hexane, filtered through Celite® 521, and diluted with toluene. The solvent was then removed in vacuo to yield a glassy yellow solid, melting point 110° C.

This example shows that 550 molecular weight polyisobutyl-substituted phenol can also be used to make the Mannich condensation products of this invention.

What is claimed is:

1. A method for preventing metal ion catalyzed oxidation and polymerization reactions in a hydrocarbon medium comprising sequestering the metal ion by the addition of an effective amount of a Mannich condensation product prepared by the Mannich condensation of:

(a) a polyisobutyl-substituted hydroxyaromatic compound, wherein the polyisobutyl group is derived from polyisobutene containing at least 70 weight percent methylvinylidene isomer and has a number average molecular Weight in the range of from about 400 to about 2500;

(b) an aldehyde;

(c) an amino acid or ester derivative thereof, and (d) an alkali metal base wherein the amino acid or ester derivative thereof is represented by the following formula:

wherein W is —[CHR"]—$_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4, and A is hydrogen or alkyl having one carbon atom to about 6 carbon atoms.

2. The method of claim 1, wherein the polyisobutyl group is derived from polyisobutene containing at least 90 weight percent methylvinylidene isomer.

3. The method of claim 1, wherein the polyisobutyl group has a number average molecular weight in the range of from about 500 to about 2,500.

4. The method of claim 1, wherein the polyisobutyl group has a number average molecular weight in the range of from about 700 to about 1,500.

5. The method of claim 1, wherein the polyisobutyl group has a number average molecular weight in the range of from about 700 to about 1,100.

6. The method of claim 1, wherein the aldehyde is formaldehyde or paraformaldehyde.

7. The method of claim 6, wherein the aldehyde is paraformaldehyde.

8. The method of claim 1, wherein the polyisobutyl-substituted hydroxyaromatic compound is present in a diluent.

9. The method of claim 8, wherein the diluent is an alkanol having one carbon atom to about 10 carbon atoms.

10. The method of claim 9, wherein the alkanol is methanol.

11. The method of claim 1, wherein the base is an alkali metal hydroxide.

12. The method of claim 11, wherein the alkali metal hydroxide is sodium hydroxide.

13. The method of claim 1, wherein the amino acid is glycine.

14. A method for preventing metal ion catalyzed oxidation and polymerization reactions in a hydrocarbon medium comprising sequestering the metal ion by the addition of an effective amount of a compound having the formula

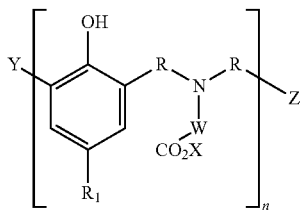

I wherein each R is independently —CHR'—, wherein R' is branched or linear alkyl having one to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms, $R_1$ is a polyisobutyl group derived from polyisobutene containing at least 70 weight percent methylvinylidene isomer and having a number average molecular weight in the range of about 400 to about 2500;

X is hydrogen, an alkali metal ion, or alkyl having one carbon atom to about 6 carbon atoms;

W is —[CHR"]—$_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4;

Y is hydrogen, alkyl having one carbon atom to about 10 carbon atoms, —CHR'OH, wherein R' is as defined above, or

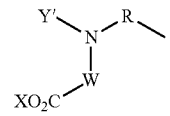

wherein Y' is —CHR'OH, wherein R' is as defined above; and R, X, and W are as defined above;

Z is hydroxyl, a hydroxyphenyl group of the formula

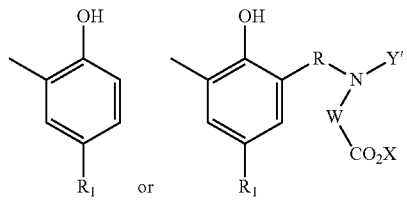

wherein R, $R_1$, Y', X, and W are as defined above, and n is an integer from 0 to 20, with the proviso that when n=0, Z must be:

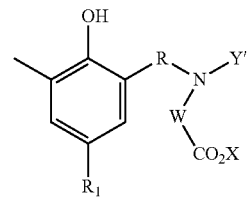

wherein R, $R_1$, Y', X, and W are as defined above.

15. The method of claim 14, wherein R is $CH_2$, $R_1$ is a polyisobutyl group derived from polyisobutene containing at least 70 weight percent methylvinylidene isomer and having a number average molecular weight of about 700 to about 1,100, W is $CH_2$, X is a sodium ion and n is an integer between 0 to 20.

16. The method of claim 1, wherein the hydrocarbon medium is an engine oil.

17. The method of claim 1, wherein the metal ion is $Fe^{+3}$.

18. The method of claim 14, wherein $R_1$ is a polyisobutyl group derived from polyisobutene containing at least 90 weight percent methylvinylidene isomer.

19. The method of claim 14, wherein $R_1$ is a polyisobutyl group having a number average molecular weight of about 500 to about 2,500.

20. The method of claim 14, wherein $R_1$ is a polyisobutyl group having a number average, molecular weight of about 700 to about 1,500.

21. The method of claim 14, wherein $R_1$ is a polyisobutyl group having a number average molecular weight of about 700 to about 1,100.

22. The method of claim 14, wherein the hydrocarbon medium is an engine oil.

23. The method of claim 14, wherein the metal ion is $Fe^{+3}$.

* * * * *